Patented Sept. 13, 1949

2,481,540

UNITED STATES PATENT OFFICE 2,481,540

METHOD OF PREPARING A PRIMARY AROMATIC AMINE DERIVATIVE OF GELATIN BY REACTION OF GELATIN WITH ISATOIC ANHYDRIDE AND PRODUCT THEREOF

John Russell and Robert Eliot Stauffer, Rochester, N. Y., assignors to Eastman Kodak Company, Rochester, N. Y., a corporation of New Jersey No Drawing. Application August 13, 1947, Serial No. 768,512

6 Claims. (Cl. 260—117)

This invention relates to a primary aromatic amine derivative of gelatin and its preparation by reacting gelatin with isatoic anhydride.

It has been thought desirable to prepare gelatin compounds having amino groups therein, which amino groups are susceptible to further reactions, particularly diazotizations. These diazonium compounds can then be coupled with azo couplers to give azo dye gelatin derivatives. The preparation of gelatin derivatives having aromatic amino groups has been previously described. For instance, the prior art has disclosed the preparation of nitrobenzoyl gelatin by reacting gelatin with nitrobenzoyl chloride, which nitrobenzoyl gelatin has been reduced by means of sodium hydrosulfite solutions to convert the nitro to the amino group resulting in an amino benzoyl gelatin. The previous methods which have been described for introducing an aromatic group containing a substituted amine involved more than one step, and the types of reactions which have been necessary heretofore for the preparation of such materials have tended to degrade the gelatin. Gelatin is susceptible to severe treatments which reduce its degree of polymerization as evidenced by a diminution of its viscosity. Therefore, it is desirable in the preparation of gelatin compounds to use not more than one step and a reaction which does not seriously degrade the gelatin. A further advantage is that the isatoic anhydride reaction can be used to prepare a gelatin derivative containing an aromatic amine without the use of chemical reducing agents whose residues or by-products may be difficult to remove from the final product and which may have a deleterious effect upon the photographic properties of the gelatin product, as, for example, sodium hydrosulfite.

One object of our invention is to provide a method for introducing an aromatic group containing a substituted amine into gelatin in one step. Another object of our invention is to prepare a gelatin derivative containing an aromatic group having thereon an amino group which gelatin derivative shows good physical characteristics. A further object of our invention is to prepare a derivative of gelatin by combining gelatin and isatoic anhydride. A still further object of our invention is to provide a gelatin derivative which may be employed to prepare diazonium salts. Other objects of our invention will appear herein.

We have found that an aromatic group containing a substituted amine may be introduced into gelatin in one step by reacting gelatin with isatoic anhydride under alkaline conditions. This is accomplished by thoroughly mixing the gelatin while in solution with the isatoic anhydride under alkaline conditions. Ordinarily, the process in accordance with our invention may be carried out in aqueous solution, although non-aqueous solvents, such as formamide may be employed for this purpose. The reaction may be speeded up by elevating the temperature and, therefore, any temperature from room temperature up to that which the gelatin experiences breakdown may be employed. Usually 110° F. is the preferable upper limit. If some breakdown of the gelatin is not objectionable, great care in controlling temperature is unnecessary. We have found that by the reaction of our invention a compound is obtained having properties differing from both gelatin and isatoic anhydride. We have also found that by such a reaction a product is obtained in which an aromatic group containing a primary amino group is introduced into the gelatin, and the gelatin itself is not appreciably reduced in degree of polymerization, such as is evidenced in many reactions in which gelatin has heretofore entered. The reaction of the isatoic anhydride and the gelatin apparently takes place as follows, H$_2$N—Gelatin being used to designate gelatin in the equation:

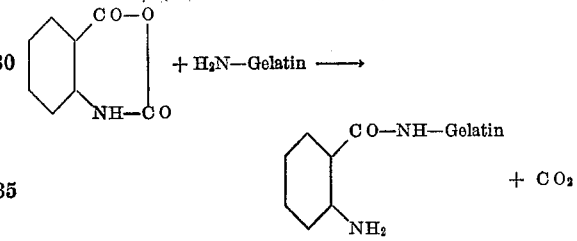

We have found that the product of this reaction is capable of forming diazonium salts with sodium nitrite and acid and that the resulting diazonium salt can be coupled with an azo coupler to give an azo dye gelatin derivative. Also, the product formed by the reaction of isatoic anhydride and gelatin can be employed in further reactions, particularly those in which NH$_2$ substituents on benzene rings enter.

Any of the various gelatins may be employed as the starting material in the method in accordance with our invention. Gelatin may be employed of either a pure, crude or dewatered variety, hydrolyzed gelatin, or gelatin having a substantial degree of polymerization, such as calfskin gelatin as prepared by careful methods. However, other gelatins, such as bone gelatin, pig gelatin, glue or degraded gelatin may be employed. It is preferred, however, if the gelatin derivative is to be employed in the fine arts, such as for photographic purposes, that a refined gelatin of a high degree of polymerization be used as the starting material.

The reaction of isatoic anhydride and gelatin is desirably carried out by mixing these two materials together under liquid conditions, such as in solution in water or in an organic liquid, such as formamide, the latter being disclosed and claimed in Damschroder and Gates application, Serial No. 768,482, filed of even date. The reaction should be carried out under alkaline conditions, such as at a pH within the range of 8 to 12 and preferably within the range of 9.5 to 10.5. The alkaline pH may be obtained by a base in aqueous solution, such as sodium hydroxide, ammonia, or tetramethyl ammonium hydroxide, for example. Upon mixing these materials together for a short time, the isatoic anhydride derivative of gelatin is obtained and may be recovered from the reaction mass by setting, washing free of the reaction materials, and drying. The resulting product is obtained free from any appreciable degradation of the gelatin and in good yield by this reaction.

The following example illustrates a useful method of preparing an isatoic derivative of gelatin:

25 parts of gelatin being substantially free of minerals were swelled and melted in 200 parts of water at 50° C. This gelatin solution was then mixed with a solution of 0.5 part of sodium hydroxide in 10 parts of water. There was then rapidly and thoroughly stirred into the mass 2 parts of isatoic anhydride in powder form. The stirring was continued for twenty minutes and a pale yellowish gel solution was obtained. This solution was chilled and thereupon set to a jelly, which jelly was noodled and washed. The washed product was dried, such as by subjecting to a current of warm air, and a sample of the resulting product was titrated with standard acid and base for comparison with the original gelatin. It was found that the major share of the buffering group in the gelatin which titrates around the pH range of 9.5 to 10.5 had disappeared in the formation of the derivative.

The product was used to form a diazonium salt with sodium nitrite and hydrochloric acid, which salt could be coupled with an azo coupler to give an azo dye gelatin derivative. $\beta$-naphthol was employed as a coupler and gave a pinkish yellow dye. In another case the diazonium salt was coupled to chromotropic acid (1,8-dihydroxy-3,6-naphthalene disulfonic acid) and a red dye gelatin derivative of good color and strength was obtained. The derivative of gelatin and isatoic anhydride may be employed in other reactions in which the $NH_2$ on the benzene ring will take part. For instance, this material may be reacted with ethyl ortho formate in the preparation of a 4-keto-3,4-dihydroquinazoline.

We claim:

1. A gelatin derivative resulting from the reaction of gelatin and isatoic anhydride at a pH of 8-12.

2. A gelatin derivative resulting from the reaction of calfskin gelatin and isatoic anhydride at a pH of 8-12.

3. A method of preparing a gelatin derivative containing an amino group which comprises mixing a solution of gelatin with isatoic anhydride at a pH of 8-12.

4. A method of preparing a gelatin derivative containing an amino group which comprises mixing an aqueous solution of gelatin with isatoic anhydride at a pH of 8 to 12.

5. A method of preparing a gelatin derivative containing an amino group which comprises mixing a solution of gelatin with isatoic anhydride at a pH of 9.5-10.5.

6. A method of preparing a gelatin derivative containing an amino group which comprises mixing an aqueous solution of gelatin with isatoic anhydride at a pH of 8-12 imparted by the addition of sodium hydroxide.

JOHN RUSSELL.
ROBERT ELIOT STAUFFER.

REFERENCES CITED

The following references are of record in the file of this patent:

Clark et al.: Jour. of Org. Chem., vol. 9, pages 55 to 67 (1944). (Copy in Scientific Library.)